(12) United States Patent
Monteiro et al.

(10) Patent No.: US 10,896,613 B2
(45) Date of Patent: Jan. 19, 2021

(54) METHOD FOR LOCATING A VEHICLE AND USER

(71) Applicant: GM Global Technology Operations LLC, Detroit, MI (US)

(72) Inventors: Sean S. Monteiro, Calgary (CA); Jarvis Chau, Markham (CA); Connor Duesterwald, Toronto (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/426,423

(22) Filed: May 30, 2019

(65) Prior Publication Data

US 2020/0380869 A1 Dec. 3, 2020

(51) Int. Cl.
*H04W 4/029* (2018.01)
*H04B 17/318* (2015.01)
*G08G 1/00* (2006.01)

(52) U.S. Cl.
CPC ............. *G08G 1/20* (2013.01); *H04B 17/318* (2015.01); *H04W 4/029* (2018.02)

(58) Field of Classification Search
None
See application file for complete search history.

(56) References Cited

U.S. PATENT DOCUMENTS

2012/0077513 A1\* 3/2012 Rizzello ................ H04W 64/00
455/456.1
2019/0122543 A1\* 4/2019 Matus .................. G08G 1/0112

\* cited by examiner

*Primary Examiner* — John F Mortell

(57) ABSTRACT

A method for finding a distressed vehicle operated by a first user located in an urban area includes providing a first mobile device of a first user. The first mobile device is electronically connected to a wireless communication network, and the first user is in possession of a vehicle. An event is detected that has occurred to the vehicle and a severity level of the event. When the severity level of the event is above a threshold it is determine that the event was sufficient enough to warrant an emergency response. A current position is determined of the first mobile device of the first user. A second mobile device of a second user is searched for within a first distance of the current position of the first mobile device. A first notification is communicated to the second user via the second mobile device.

16 Claims, 4 Drawing Sheets

METHOD FOR LOCATING A VEHICLE AND USER

INTRODUCTION

The present disclosure relates generally to a method for assisting users of shared transportation vehicles and more particularly for assisting users of shared vehicles in an urban setting by way of their smart phones and other mobile devices.

Vehicle sharing platforms are becoming increasingly popular in urban areas where parking for automobiles is at a premium and a growing number of people are living, working, and visiting downtown areas. Some of the modes of shared transportation include electronic bikes, scooters, Segways, hover boards, etc. that users activated by applications on their smart phones. Along with increasing use of shared transportation devices, more users are being injured or otherwise requiring aid or support while using the devices. Accordingly, there is a need in the art for methods that use existing infrastructure to provide timely support to users requiring it and location accuracy to those users attempting to provide the aid.

SUMMARY

A method for finding a distressed vehicle operated by a first user located in an urban area is provided. The method includes providing a first mobile device of a first user. The first mobile device is electronically connected to a wireless communication network, and the first user is in possession of a vehicle. Next, an event and a severity level of the event is detected. When the severity level of the event is above a threshold, the event creates the distressed vehicle. A current position of the first mobile device of the first user is determined. A second mobile device of a second user is searched for within a first distance of the current position of the first mobile device.

In one example of the present disclosure, a first notification is communicated to the second user via the second mobile device. The first notification was determined to be received by the second user. A conversation is initialized between the second user and a third user when the first notification is acknowledged.

In another example of the present disclosure, the first notification is removed from the second user when the first notification is not acknowledged for a period of time.

In yet another example of the present disclosure, the method further includes sending a second notification to the first mobile device of the first user when the severity level of the event is below a first threshold.

In yet another example of the present disclosure, the method further includes providing the first mobile device of the first user, and wherein the first mobile device is electronically connected to a wireless communication network and the vehicle.

In yet another example of the present disclosure, the method further includes providing the first mobile device of the first user, and wherein the first mobile device is electronically connected to a wireless communication network comprising at least one of a Wi-Fi, mobile device, and Bluetooth wireless networks.

In yet another example of the present disclosure, finding a current position of the first mobile device using a Relative Signal Strength Indicator (RSSI) having a first equation:

$$RSSI = -10n\log 10\left(\frac{d}{d_0}\right) + A_0,$$

and
d is a relationship between RSSI and a first distance, n is a constant depending upon an environment, $A_0$ is an initial RSSI value at an initial distance $d_0$, and $d_0$ is the initial distance from an advertising device.

In yet another example of the present disclosure, the method further comprises communicating the current position of the first mobile device to the second mobile device and an emergency service.

In yet another example of the present disclosure, the method further includes searching for an second mobile device of a second user within 200 meters of the current position of the first mobile device.

In yet another example of the present disclosure, the method further includes contacting an emergency service when the first mobile device of the first user has not moved and the severity level of the event is above a first threshold.

A method is provided for finding a distressed vehicle operated by a first user located in an urban area. The method includes providing a first mobile device of a first user. The first mobile device is electronically connected to a wireless communication network and the first user is in possession of a vehicle. The method further includes detecting an event that has occurred to the vehicle and a severity level of the event. When the severity level of the event is above a threshold, the event creates the distressed vehicle. The method further includes finding a current position of the first mobile device of the first user and searching for a second mobile device of a second user within a first distance of the current position of the first mobile device. The method also includes communicating a first notification to the second user via the second mobile device, determining when the first notification was received by the second user, initiating a conversation between the second user and a third user when the first notification is acknowledged, and removing the first notification from the second user when the first notification is not acknowledged for a period of time.

In one example of the present disclosure, the method further includes sending a second notification to the first mobile device of the first user when the severity level of the event is below a first threshold.

In another example of the present disclosure, the method further includes providing the first mobile device of the first user, and wherein the first mobile device is electronically connected to a wireless communication network and the vehicle.

In yet another example of the present disclosure, the method further comprises instructing the vehicle to project a visual signal via at least one of a headlight, a tail light, and a running light, the visual signal communicating a message containing at least one of the severity level of the event, the current position of the event, and a type of service required. The visual signal is received via at least one of a plurality of video surveillance apparatuses. The message is communicated to a party most capable of responding with a required service.

In yet another example of the present disclosure, the method further comprises finding a current position of the first mobile device using a Relative Signal Strength Indicator (RSSI) having a first equation $$RSSI = -10n\log 10\left(\frac{d}{d_0}\right) + A_0,$$

and d is a relationship between RSSI and a first distance, n is a constant depending upon an environment, $A_0$ is an initial RSSI value at an initial distance $d_0$, and $d_0$ is the initial distance from an advertising device.

In yet another example of the present disclosure, the method of further includes contacting an emergency service when the first mobile device of the first user has not moved and the severity level of the event is above a first threshold.

A method is provided for finding a distressed vehicle operated by a first user located in an urban area. The method includes providing a first mobile device of a first user. The first mobile device is electronically connected to a wireless communication network and the first user is in possession of a vehicle. The method includes detecting an event that has occurred to the vehicle and a severity level of the event. When the severity level of the event is above a threshold, the distressed vehicle is created. The method further includes finding a current position of the first mobile device of the first user, searching for a second mobile device of a second user within a first distance of the current position of the first mobile device, communicating the current position of the first mobile device to the second mobile device and an emergency service, and searching for an second mobile device of a second user within 200 meters of the current position of the first mobile device.

In one example of the present disclosure, the method further includes communicating a first notification to the second user via the second mobile device, determining when the first notification was received by the second user, and initiating a conversation between the second user and a third user when the first notification is acknowledged.

In another example of the present disclosure, the method further comprises providing the first mobile device of the first user, and wherein the first mobile device is electronically connected to a wireless communication network and the vehicle.

In yet another example of the present disclosure, the method further comprises providing the first mobile device of the first user, and wherein the first mobile device is electronically connected to a wireless communication network comprising at least one of a Wi-Fi, mobile device, and Bluetooth wireless networks.

In yet another example of the present disclosure, the method further comprises instructing the vehicle to project a visual signal via at least one of a headlight, a tail light, and a running light, the visual signal communicating a message containing at least one of the severity level of the event, the current position of the event, and a type of service required. The visual signal is received via at least one of a plurality of video surveillance apparatuses. The message is communicated to a party most capable of responding with a required service.

In yet another example of the present disclosure, the method further comprises finding a current position of the first mobile device using a Relative Signal Strength Indicator (RSSI) having a first equation:

$$RSSI = -10n\log 10\left(\frac{d}{d_0}\right) + A_0,$$

and d is a relationship between RSSI and a first distance, n is a constant depending upon an environment, $A_0$ is an initial RSSI value at an initial distance $d_0$, and $d_0$ is the initial distance from an advertising device.

The above features and advantages and other features and advantages of the present disclosure are readily apparent from the following detailed description when taken in connection with the accompanying drawings.

BRIEF DESCRIPTION OF THE DRAWING

The drawings described herein are for illustration purposes only and are not intended to limit the scope of the present disclosure in any way.

DESCRIPTION

The following description is merely exemplary in nature and is not intended to limit the present disclosure, application, or uses.

Figure 1:
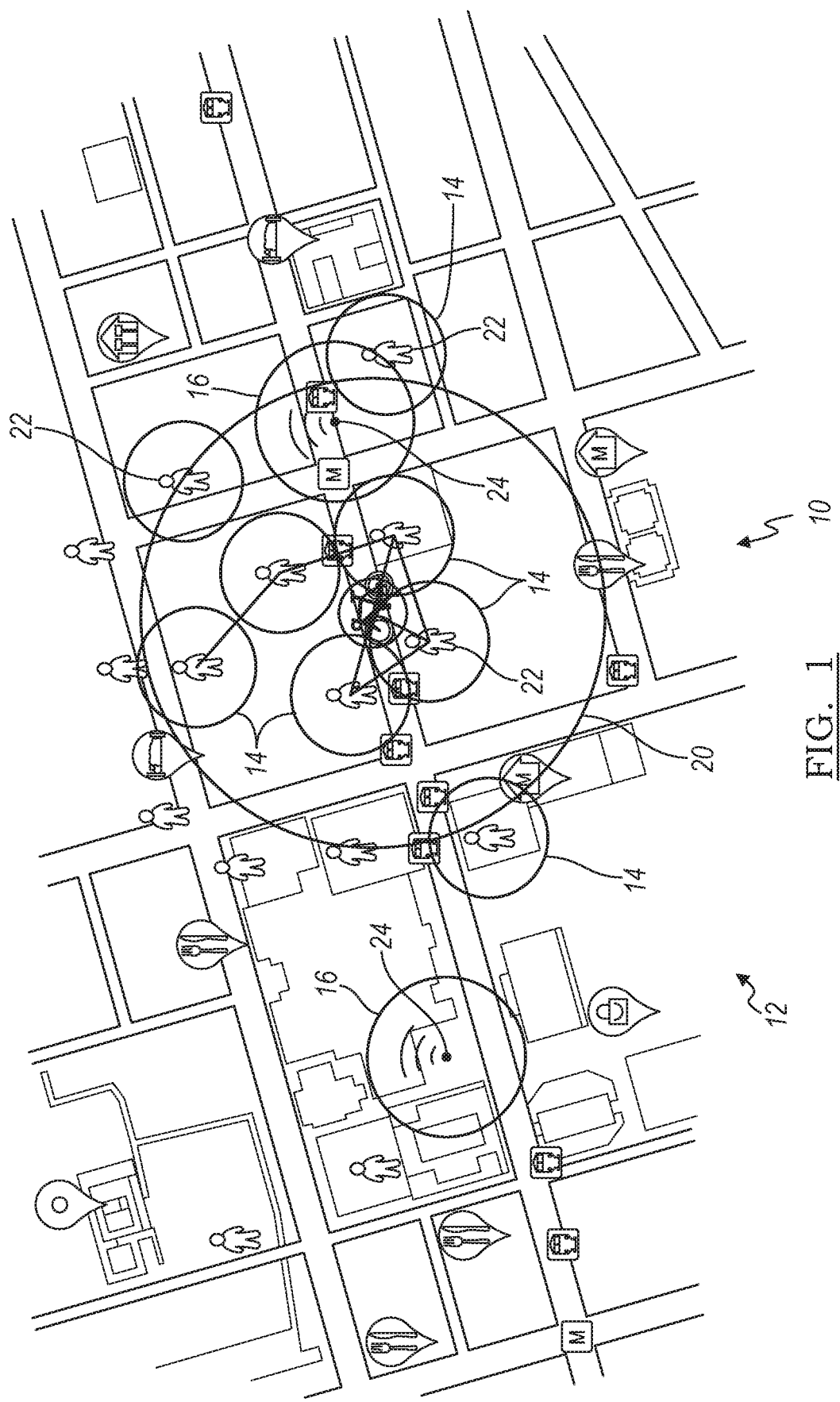
FIG. 1 is a map of a city detailing a wireless communication system according to the principles of the present disclosure.

Examples of the present disclosure advantageously provide a wireless communication system for users of shared transportation devices such as electric bicycles or e-bikes, electric scooters, electric "hover boards", Segways, or other vehicles that can be activated using a smart phone or other mobile device application. The transportation device can be temporarily linked to the user's mobile device using a wireless data connection. In addition to the shared transportation devices and mobile device application, the owner or operator of the transportation devices may also provide additional services including emergency response and navigation. For example, in a predominantly urban setting, GPS systems do not provide as accurate location data as in less urban areas due to a "concrete canyon" phenomenon. In these types of geographic situations, a mesh network 12 of wireless communication coverage areas is utilized to precisely identify the location of a distressed user. Referring to FIG. 1 a map 10 is shown of a downtown urban area. The map 10 includes the mesh network 12 that is made up of individual coverage areas created through Bluetooth 14, WiFi 16, mobile 4G or 5G network 18, and contracted aid 20 wireless networks. More particularly, the mesh network 12 includes Bluetooth 14 wireless signals generated by mobile phone or smart phone devices as a signal origination point 22. The several signal origination points 22 are mobile or movable in this regard. Still, while the mobile phone devices may not be able to connect to communicate with each other due to their signal strength, they are capable of communicating with each other through the mobile 4G or 5G network 18. Additionally, fixed or mobile WiFi signal generation devices 24 may also be included into the mesh network 12 of individual wireless data exchange communications.

The distance from a signal generation device 24 of the mesh network 12 to a receiving device such as a mobile phone can be accurately determined through an equation using a Received Signal Strength Indicator (RSSI). The RSSI decreases with an increase in distance from the signal generation device 24 and can be used to estimate the distance between the signal generation device 24 and the receiving device. The relationship can be approximated by the following equations:

$$RSSI = -10n\log10\left(\frac{d}{d_0}\right) + A_0,$$

and $d=10*(A_0-RSSI/10n)$, when $d_0=1$, wherein n=constant dependent upon the environment, and $A_0$=RSSI value at $d_0$.

Using a series of distances generated from multiple signal generation devices 24, a highly accurate location pinpoints where the receiving device is.

Figure 2:
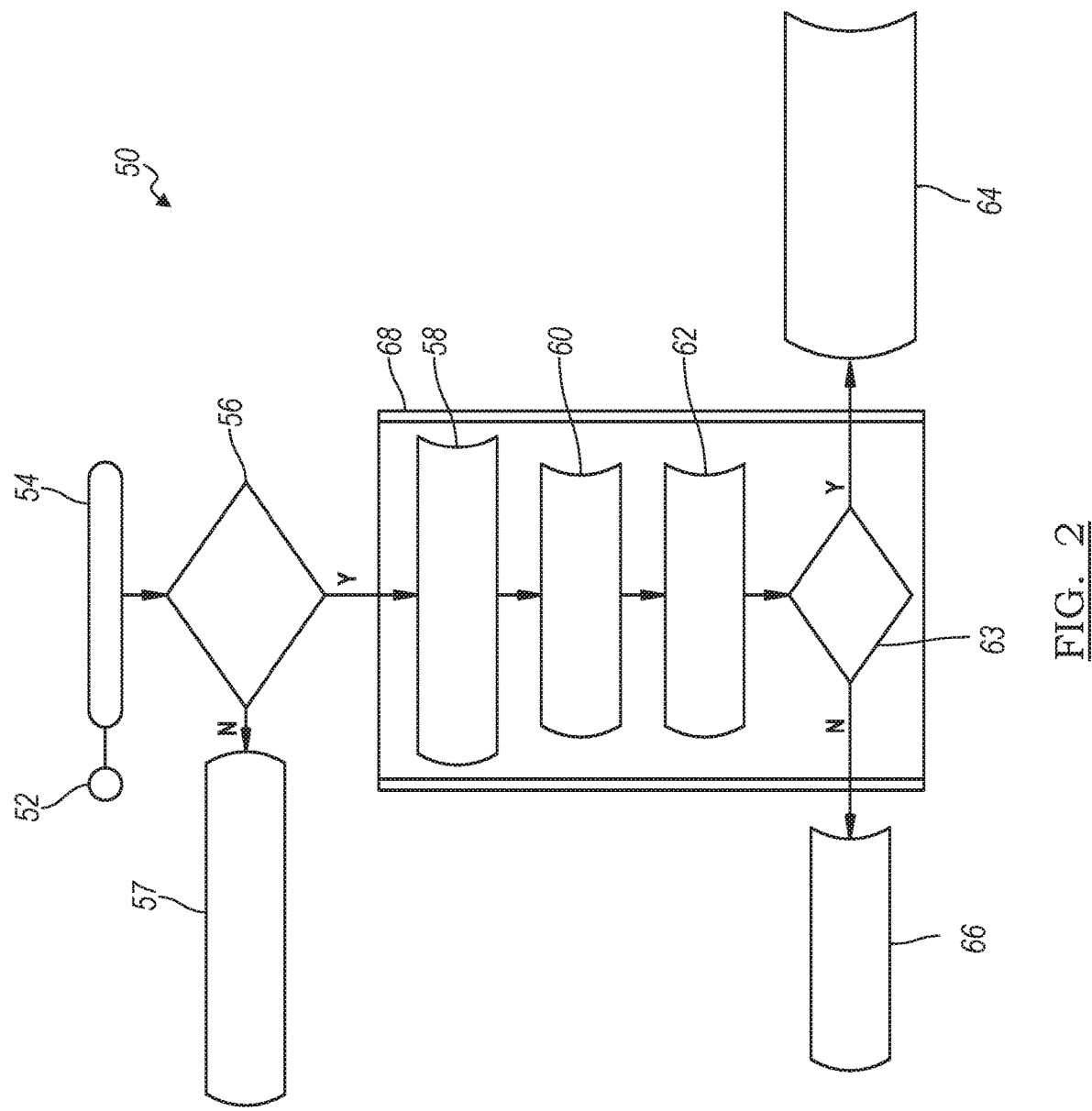
FIG. 2 is a flowchart depicting a method of locating and delivering service to a distressed user according to the principles of the present disclosure.

Turning now to FIG. 2, a flowchart depicts a method 50 of providing assistance to a user of a shared transportation device. The method 50 begins with a first step 52 of a user having a mobile or smart phone device, an application stored on the mobile phone device, and a shared vehicle linked to the application on the user's mobile phone while the user is in an urban area. In addition to the user's mobile phone device having the application, other persons or users in the area also have the same application in operation on their mobile phone devices. In this manner, the mesh network 12 not only includes various wireless data signal sources but also includes the multitude of users of those signal sources having the application on their mobile phone device.

A second step 54 detects an event occurring with either the shared transportation device or the user themselves. The event can include, among other things, an accident, a broken transportation device, a trauma to the user, and a lost user. The event is assessed a severity or seriousness level. When the severity level exceeds a specific threshold as determined in a third step 56, a fourth step 58 detects the user's and shared transportation device's last known location. However, if the severity level does not exceed the specific threshold, a message is sent to the user 57 expressing interest in the well being of the user offering any additional services. Additionally, if still operational, lights of the shared transportation device (for example headlights, tail lights, running lights, etc.) project a visual signal by blinking to visually communicate to a detection device or video surveillance such as smart phones, vehicle cameras, security cameras, and smart street lamps. The lights of the shared transportation device blink at different frequencies or patterns depending upon the severity of the event as well as a prediction as to what type of services might be required by the user. For example, if Emergency Medical Service (EMS) is required, the specific pattern or frequency off light flashes will be displayed by the shared transportation vehicle, received by one of the detection devices listed above, and communicated to the service provider. Depending upon the capabilities of the vehicle lights, the signals sent by the lights may be detectable by both humans and cameras. Alternatively, the vehicle lights may operate to send a signal that only digital receiving devices can perceive. For example, while the hazard lights of a vehicle may be in operation, a signal may be provided by the vehicle lights that does not interfere with the visual signal of hazard lights.

Next, a fifth step 60 finds a second user having another mobile phone device that includes the application used by the original user to access the shared transportation device. The second user, being the closest second user in proximity to the original user, is sent a notification 62 via the mobile phone device that the original user is in distress and requires support. When the notification is opened 63, a sixth step 64 initiates a chat between an emergency service and the second user and also includes any additional users that also responded to the notification sent to their mobile phone devices since they are also within the area of the event. Upon the occurrence that the notification is not opened 63 and responded to, a seventh step 66 removes the notification and a notification is sent to the original user that additional support is being sent.

During the execution of the method 50, an eighth step 68 is executed when the application fails to detect movement of the shared transportation device for a certain amount of time after the event and the user cannot be contacted. In this case, emergency services are notified directly and provided with the last known location of the user and shared transportation device.

Figure 3:
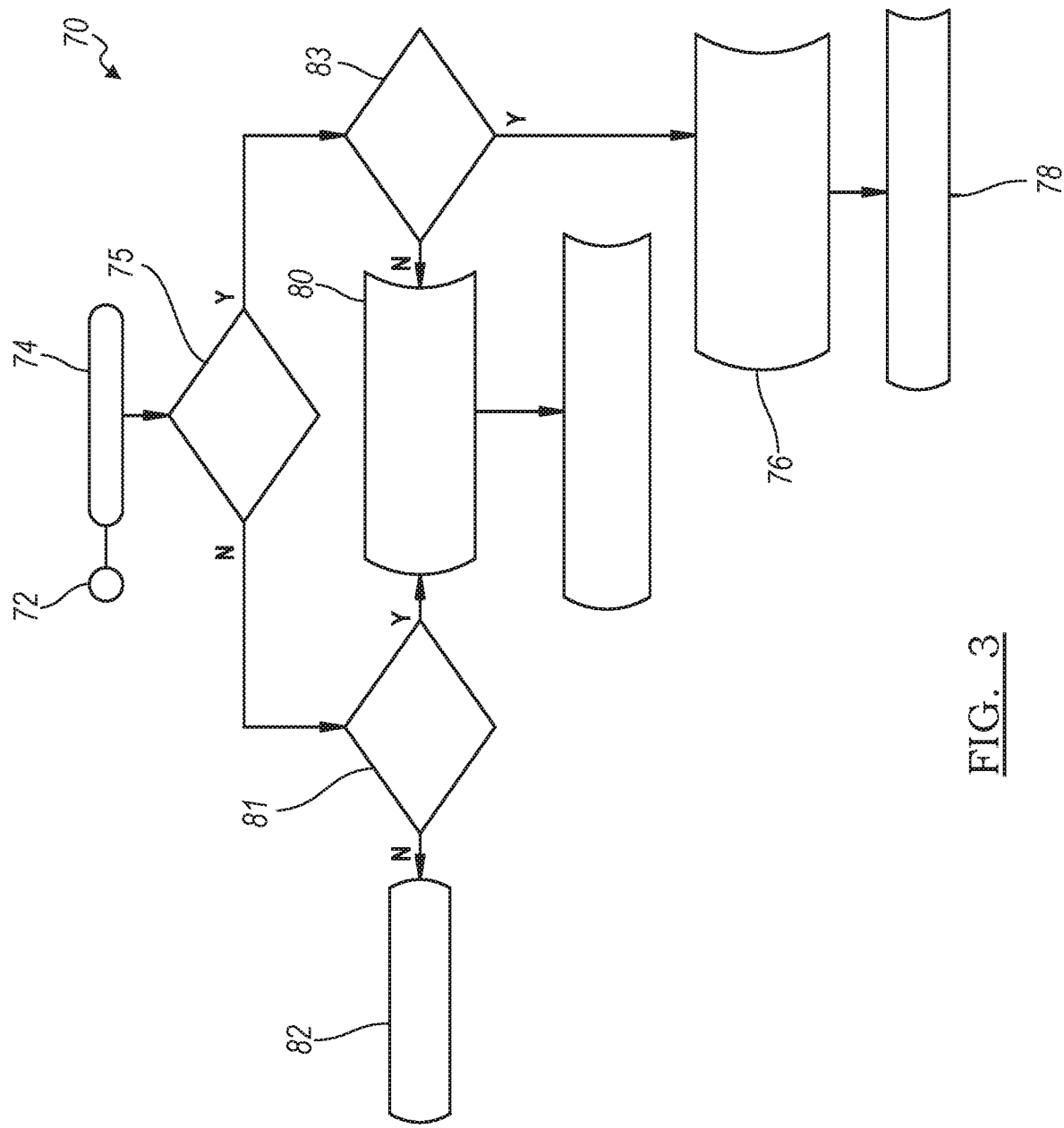
FIG. 3 a flowchart depicting another method of locating and delivering service to a distressed user according to the principles of the present disclosure.

Referring now to FIG. 3, a flowchart depicts another method 70 of providing assistance to a user of a shared transportation device. The method 70 begins with a first step 72 of a user having a mobile or smart phone device, an application stored on the mobile phone device, and a shared vehicle linked to the application on the user's mobile phone while the user is in an urban area. In addition to the user's mobile phone device having the application, other persons or users in the area also have the same application in operation on their mobile phone devices. In this manner, the mesh network 12 not only includes various wireless data signal sources but also includes the multitude of users of those signal sources having the application on their mobile phone device.

A second step 74 detects an event occurring with either the shared transportation device or the user themselves. The event can include, among other things, an accident, a broken transportation device, a trauma to the user, and a lost user. When the user's mobile phone device and a second user's mobile phone device is available 75, a third step 76 connects the shared transportation device user's mobile phone device with the second user's mobile phone device. A fourth step 78 communicates adjusted GPS coordinates to emergency services the location of the shared transportation device and user to the second user and to emergency services. A fifth step 80 of the method 70 is executed when neither the shared transportation device user's mobile phone device or the second user's mobile phone device is available 83 which includes directly alerting emergency services of the location of the shared transportation device in destress through the mesh network 12 of additional user's mobile phone devices and WiFi routers. A fifth step 82 sends location data to emergency service through the shared transportation device connectivity device when the original user's and any external user's mobile phone devices are not available to do so 81.

Figure 5:
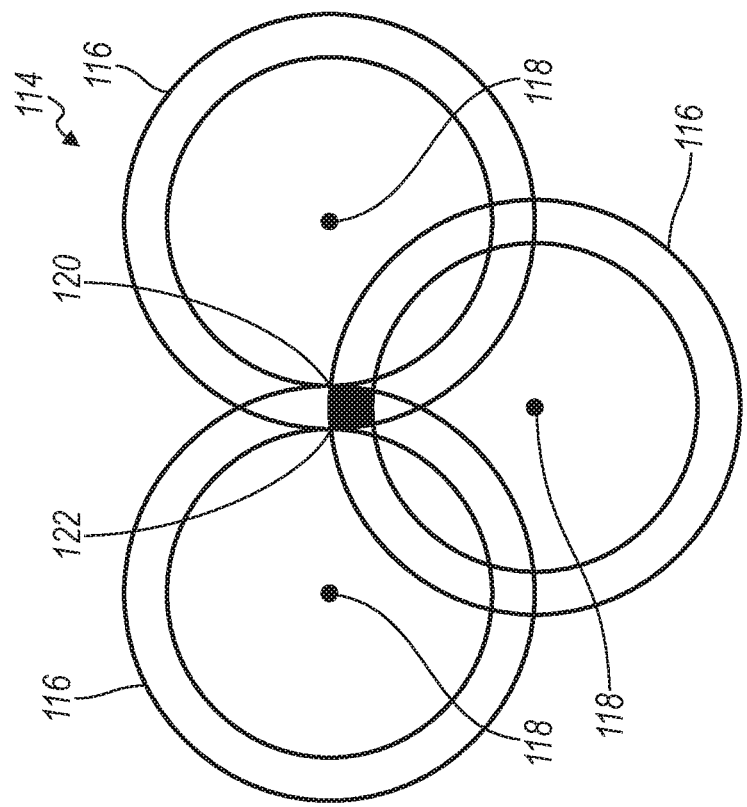
FIG. 5 is a schematic of another technique for locating a user according to the principles of the present disclosure.
Figure 4:
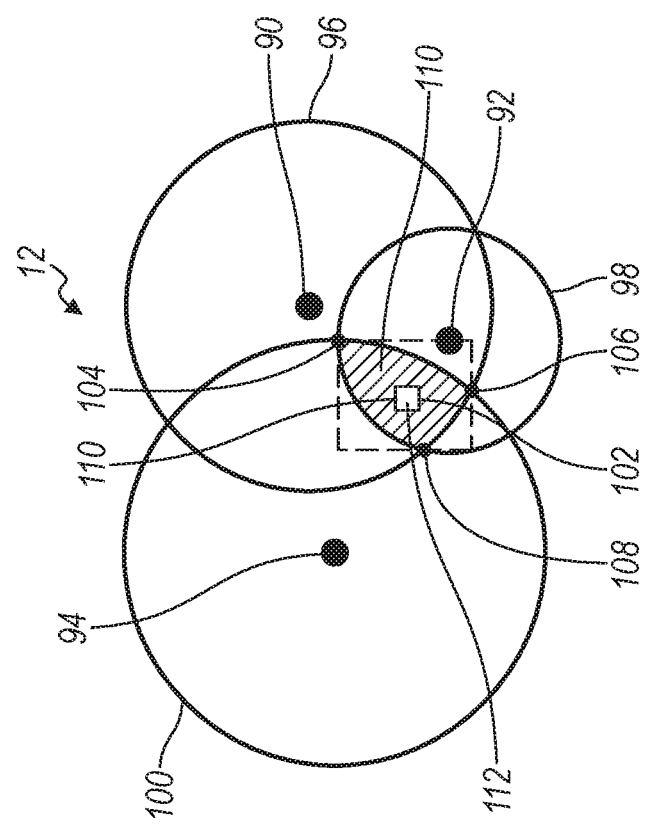
FIG. 4 is a schematic of a technique for locating a user according to the principles of the present disclosure.

Turning now to FIGS. 4 and 5, alternative methods of more precisely locating a user in a mesh network 12 are demonstrated and will now be described. For example, FIG. 4 shows a mesh network 12 including a first, second, and third mesh router 90, 92, 94, each of the mesh router's respective signal area 96, 98, 100 and the mesh user 102. The outer limits of the signal areas 96, 98, 100 intersect with each other at points 104, 106, 108 surrounding the mesh user 102. The resulting area 110 formed by the arcs of the outer limits of the signal areas 96, 98, 100 is averaged and the mesh user 102 is estimated to be at the center 112 of the area 110.

A disc trilateration method 114 as illustrated in FIG. 5, includes creating discs 116 around the mesh routers 118. An intersection region 120 is used to encompass the user 122 and an average is taken of the intersection region 120 to determine the location of the user 122.

While examples have been described in detail, those familiar with the art to which this disclosure relates will recognize various alternative designs and examples for practicing the disclosed structure within the scope of the appended claims.

The following is claimed:

1. A method for finding a vehicle operated by a first user located in an urban area, the method comprising:
   providing a first mobile device of the first user, and wherein the first mobile device is electronically connected to a wireless communication network and the vehicle, and the first user is in possession of the vehicle;
   detecting an event involving the vehicle, wherein the event is one of an accident involving the vehicle or a malfunction of the vehicle;
   finding a current position of the first mobile device of the first user; and
   searching for a second mobile device of a second user within a first distance of the current position of the first mobile device;
   instructing the vehicle to project a visual signal via at least one of a headlight, a tail light, and a running light, the visual signal communicating a message containing at least one of the current position of the event and a type of service required;
   receiving the visual signal via at least one of a plurality of video surveillance apparatuses; and
   communicating the message to a party capable of responding with a required service.

2. The method of claim 1 further comprising:
   communicating a first notification to the second user via the second mobile device;
   determining when the first notification was received by the second user; and
   initiating a conversation between the second user and a third user when the first notification is acknowledged.

3. The method of claim 2 further comprises removing the first notification from the second user when the first notification is not acknowledged for a period of time.

4. The method of claim 1 wherein providing a first mobile device of the first user, and wherein the first mobile device is electronically connected to a wireless communication network further comprises providing the first mobile device of the first user, and wherein the first mobile device is electronically connected to the wireless communication network comprising at least one of a Wi-Fi, mobile device, and Bluetooth wireless networks.

5. The method of claim 1 wherein finding a current position of the first mobile device further comprises finding the current position of the first mobile device using a Relative Signal Strength Indicator (RSSI) having a first equation $$RSSI = -10n\log10\left(\frac{d}{d_0}\right) + A_0,$$

and d is a relationship between RSSI and the first distance, n is a constant depending upon an environment, $A_0$ is an initial RSSI value at an initial distance $d_0$, and $d_0$ is the initial distance from a signal generating device.

6. The method of claim 5 further comprises communicating the current position of the first mobile device to the second mobile device and an emergency service.

7. The method of claim 1 wherein searching for a second mobile device of a second user within a first distance of the current position of the first mobile device further comprises searching for the second mobile device of the second user within 200 meters of the current position of the first mobile device.

8. The method of claim 1 further comprises contacting an emergency service when the first mobile device of the first user has not moved.

9. A method for finding a vehicle operated by a first user located in an urban area, the method comprising:
   providing a first mobile device of the first user, and wherein the first mobile device is electronically connected to a wireless communication network, and the first user is in possession of the vehicle;
   detecting an event involving the vehicle, wherein the event is one of an accident involving the vehicle or a malfunction of the vehicle;
   finding a current position of the first mobile device of the first user;
   searching for a second mobile device of a second user within a first distance of the current position of the first mobile device;
   communicating a first notification to the second user via the second mobile device;
   determining when the first notification was received by the second user;
   initiating a conversation between the second user and a third user when the first notification is acknowledged; and
   removing the first notification from the second user when the first notification is not acknowledged for a period of time.

10. The method of claim 9 further comprising:
    instructing the vehicle to project a visual signal via at least one of a headlight, a tail light, and a running light, the visual signal communicating a message containing at least one of the current position of the event and a type of service required;
    receiving the visual signal via at least one of a plurality of video surveillance apparatuses; and
    communicating the message to a party most capable of responding with a required service.

11. The method of claim 10 wherein finding a current position of the first mobile device further comprises finding the current position of the first mobile device using a Relative Signal Strength Indicator (RSSI) having a first equation $$RSSI = -10n\log10\left(\frac{d}{d_0}\right) + A_0,$$

and d is a relationship between RSSI and the first distance, n is a constant depending upon an environment, $A_0$ is an initial RSSI value at an initial distance $d_0$, and $d_0$ is the initial distance from a signal generating device.

12. The method of claim 9 further comprises contacting an emergency service when the first mobile device of the first user has not moved.

13. A method for finding a vehicle operated by a first user located in an urban area, the method comprising:
providing a first mobile device of the first user, and wherein the first mobile device is electronically connected to a wireless communication network, and the first user is in possession of the vehicle;
detecting an event involving the vehicle, wherein the event is one of an accident involving the vehicle or a malfunction of the vehicle;
finding a current position of the first mobile device of the first user;
searching for a second mobile device of the second user within 200 meters of the current position of the first mobile device;
communicating the current position of the first mobile device to the second mobile device and an emergency service;
communicating a first notification to the second user via the second mobile device;
determining when the first notification was received by the second user; and
initiating a conversation between the second user and a third user when the first notification is acknowledged.

14. The method of claim 13 wherein providing a first mobile device of the first user, and wherein the first mobile device is electronically connected to a wireless communication network further comprises providing the first mobile device of the first user, and wherein the first mobile device is electronically connected to the wireless communication network and the vehicle.

15. The method of claim 13 wherein providing a first mobile device of the first user, and wherein the first mobile device is electronically connected to a wireless communication network further comprises providing the first mobile device of the first user, and wherein the first mobile device is electronically connected to the wireless communication network comprising at least one of a WiFi, mobile device, and Bluetooth wireless networks.

16. The method of claim 15 wherein finding a current position of the first mobile device further comprises finding the current position of the first mobile device using a Relative Signal Strength Indicator (RSSI) having a first equation $$RSSI = -10n\log10\left(\frac{d}{d_0}\right) + A_0,$$

and
d is a relationship between RSSI and the first distance, n is a constant depending upon an environment, $A_0$ is an initial RSSI value at an initial distance $d_0$, and $d_0$ is the initial distance from a signal generating device.

* * * * *